(12) United States Patent
Richards et al.

(10) Patent No.: US 8,380,661 B2
(45) Date of Patent: Feb. 19, 2013

(54) DATA MIGRATION USING COMMUNICATIONS AND COLLABORATION PLATFORM

(75) Inventors: Brian Hale Richards, Chicago, IL (US); Michael Holzman, Chicago, IL (US); Charles Nebolsky, Northbrook, IL (US); Erin Hsu, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 121 days.

(21) Appl. No.: 13/018,079

(22) Filed: Jan. 31, 2011

(65) Prior Publication Data
US 2012/0084254 A1 Apr. 5, 2012

Related U.S. Application Data

(60) Provisional application No. 61/389,837, filed on Oct. 5, 2010.

(51) Int. Cl.
*G06F 17/30* (2006.01)
(52) U.S. Cl. .................................................. 707/609
(58) Field of Classification Search ............. 707/2, 205, 707/609; 717/173
See application file for complete search history.

(56) References Cited

U.S. PATENT DOCUMENTS

2005/0131970 A1* 6/2005 Salazar et al. ............... 707/205
2011/0161952 A1* 6/2011 Poddar et al. ............... 717/173

* cited by examiner

*Primary Examiner* — Etienne Leroux
(74) *Attorney, Agent, or Firm* — Nathan O. Greene; Brinks Hofer Gilson & Lione

(57) ABSTRACT

Data migration using communications and collaboration platform provides an efficient and flexible method for migrating data from an existing system to a new system. In particular, the method includes extracting data, cleansing the extracted data based on a master record, receiving approval for the cleansed data, and migrating the approved data into the new system.

18 Claims, 13 Drawing Sheets

DATA MIGRATION USING COMMUNICATIONS AND COLLABORATION PLATFORM

PRIORITY CLAIM

This application claims the priority benefit of Provisional U.S. Patent Application Ser. No. 61/389,837, filed on Oct. 5, 2010, which is incorporated herein by reference in its entirety. This application is related to Non-Provisional U.S. patent application entitled "Operations Management Using Communications and Collaboration Platform", assigned Ser. No. 13/018,061, filed on the same date as the present application, which is incorporated herein by reference in its entirety.

BACKGROUND

1. Technical Field

This disclosure relates to a platform for delivering and operating network transformation and collaboration among different systems.

2. Related Art

Tools for increasing productivity, such as, for example, word processors, spreadsheets, and instant messengers have been available to businesses to help increase efficiencies of business operations. Such tools operated independently with respect to each other and were installed in a single machine. Therefore, different tools had to be purchased and installed onto the same machine to take advantage of different functionalities. As businesses became larger and their operations more complex, the number of tools required increased and the tools became more difficult to manage. To address this issue, productivity suites were developed such that various tools were provided in a single package and enabled interoperability between the tools.

However, as businesses became more and more dependent on the Internet, a need arose for the tools to be accessible from anywhere on the Internet or other computer networks. Existing tools were installed on local machines, and access to these tools over the Internet was limited. To address this issue, various tools have been offered as a software-as-a-service ("SaaS"), enabling the functionalities of the tools to be provided to anyone having access to the Internet without having to install the tools on local machines. However, these SaaS tools had limitations since they operated independently of each other, necessitating businesses to access different SaaS tools to achieve different functionalities.

Therefore, a need exists to address the problems noted above and others previously experienced.

SUMMARY

A Communications and Collaboration ("C2") Platform provides a seamless layer on top of multiple software as a service ("SaaS") models, cloud-based systems, legacy equipment and/or other types of systems which allows enhanced management of operation and automation of deployment of business offerings. The C2 Platform allows businesses to operate across the different systems. The C2 Platform provides an interface through which different systems may communicate, thereby allowing a user or a third party application the ability to receive services provided by the different platforms.

The C2 Platform allows seamless operation of services provisioned across the multiple systems. The C2 Platform provides adaptors, libraries, business rules and/or other tools that detect a common operational activity, determines services to be provisioned and systems affected by the common operational activity, and orchestrates the affected systems to the provisioned services to the systems. The C2 Platform may further meter the provisioned services to provide various metrics, such as, for example, usage records and bills. The C2 Platform may also diagnose problems that may occur to the services and provide a fix or suggest solutions.

The C2 Platform further helps efficient and automated migration from one system to another system, for example, from legacy systems to cloud-based systems. The C2 Platform provides adaptors, libraries, business rules and/or other tools that extract the data from various systems (for example, legacy systems), cleanses them, formats, and places them in the desired systems. The C2 Platform may also perform automatic testing of the migrated data, such as for presence, contact centers, voicemail, etc.

The data and the functionality of one system may also be migrated and spread out over multiple systems. For example, telephony functionality and contacts may be implemented in one system, while office and email functionality may be implemented by a second system, call routing functionality implemented in a third system, and common metering functionalities in a fourth system. The C2 Platform allows businesses to manage and operate the functionalities spread across multiple systems such as described above. The C2 Platform thus provides the connectors, adaptors, workflows and processes necessary to provide these management and operation functionalities.

The C2 Platform also provides network operation center ("NOC") integration, help desk integration, automated extraction and insertion across distributed systems. The C2 Platform further provides functionalities for operating and provisioning services directly as changes are made to master records such as lightweight directory access protocol ("LDAP"), moving services seamlessly from being on-premise to being cloud-based (or vice versa), and providing component services (collaboration primitives or abstractions) that can be more easily consumed. In addition, the C2 Platform provides functionalities for automatically testing the end-to-end system including routing and bandwidth quality. The C2 Platform provides client applications or users easy access to the component services such that these services may be provided in a collaborative manner.

A data migration method using the C2 Platform includes receiving a migration request to migrate source data from one or more source systems to one or more new systems and extracting the source data from the one or more source systems to obtain extracted source data. The method further includes accessing a master record stored in a database, comparing the extracted source data with the master record to obtain a comparison between the extracted source data and the master record and determine if a change is to be made on the extracted source data based on the comparison. If it is determined that a change is to be made, the method includes making the change on the extracted source data. The method also includes determining one or more target systems as the one or more new systems, and migrating the source data to the one or more target systems.

Other systems, methods, and features will be, or will become, apparent to one with skill in the art upon examination of the following figures and detailed description. It is intended that all such additional systems, methods, and features be included within this description, be within the scope of the disclosure, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
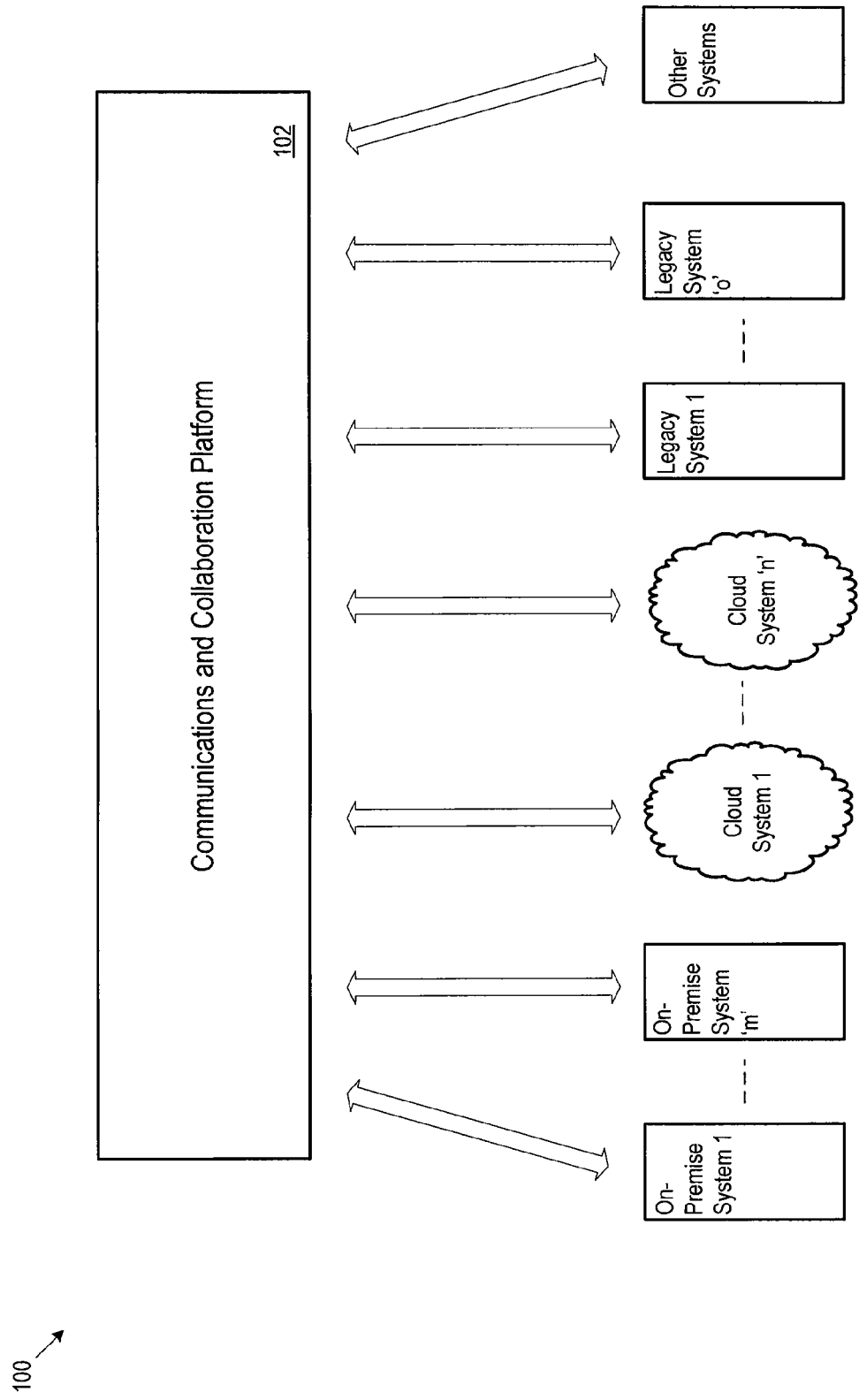
FIG. 1 shows diagram a Communications and Collaboration ("C2") Platform.

FIG. 1 shows diagram 100 of a Communications and Collaboration ("C2") Platform in communication with various types of systems. The C2 Platform may be centrally hosted by an outsourced infrastructure (Infrastructure Outsourcing; "IO") and provide collaboration capabilities among various systems, such as one or more on-premise systems (illustrated as On-Premise System 1 to On-Premise System 'm'), one or more cloud-based systems (illustrated as Cloud System 1 to Cloud System 'n'), one or more legacy systems (illustrated as Legacy System 1 to Legacy System 'o'), or other types of systems.

As discussed in more detail below, the C2 Platform allows communication between multiple like-type systems, such as between two On-Premise Systems, between two Cloud Systems, and/or between two Legacy Systems. And, the C2 platform allows communication between multiple different-type systems, such as between an On-Premise System and a Cloud System, between an On-Premise System and a Legacy System, and/or between a Cloud System and a Legacy System. FIG. 1 is merely provided for illustration purposes. The system may include each of the one or more On-Premise Systems, the one or more Cloud Systems, and the one or more Legacy Systems. Or, the system may include fewer systems than that illustrated in FIG. 1, such as only On-Premise Systems and Cloud Systems.

Specific examples of such systems supported by the C2 Platform may be, for example, Hosted Collaboration Solution ("HCS") system by Cisco™, Business Productivity Online Standard system by Microsoft™, and Accenture™ Contact Center Consolidation Infrastructure ("CCCI"). The C2 Platform may provide a layer on top of these various types of systems which allows for automated migration of functionalities and/or data provided by any system to any other single system or spread out over multiple systems.

Figure 2:
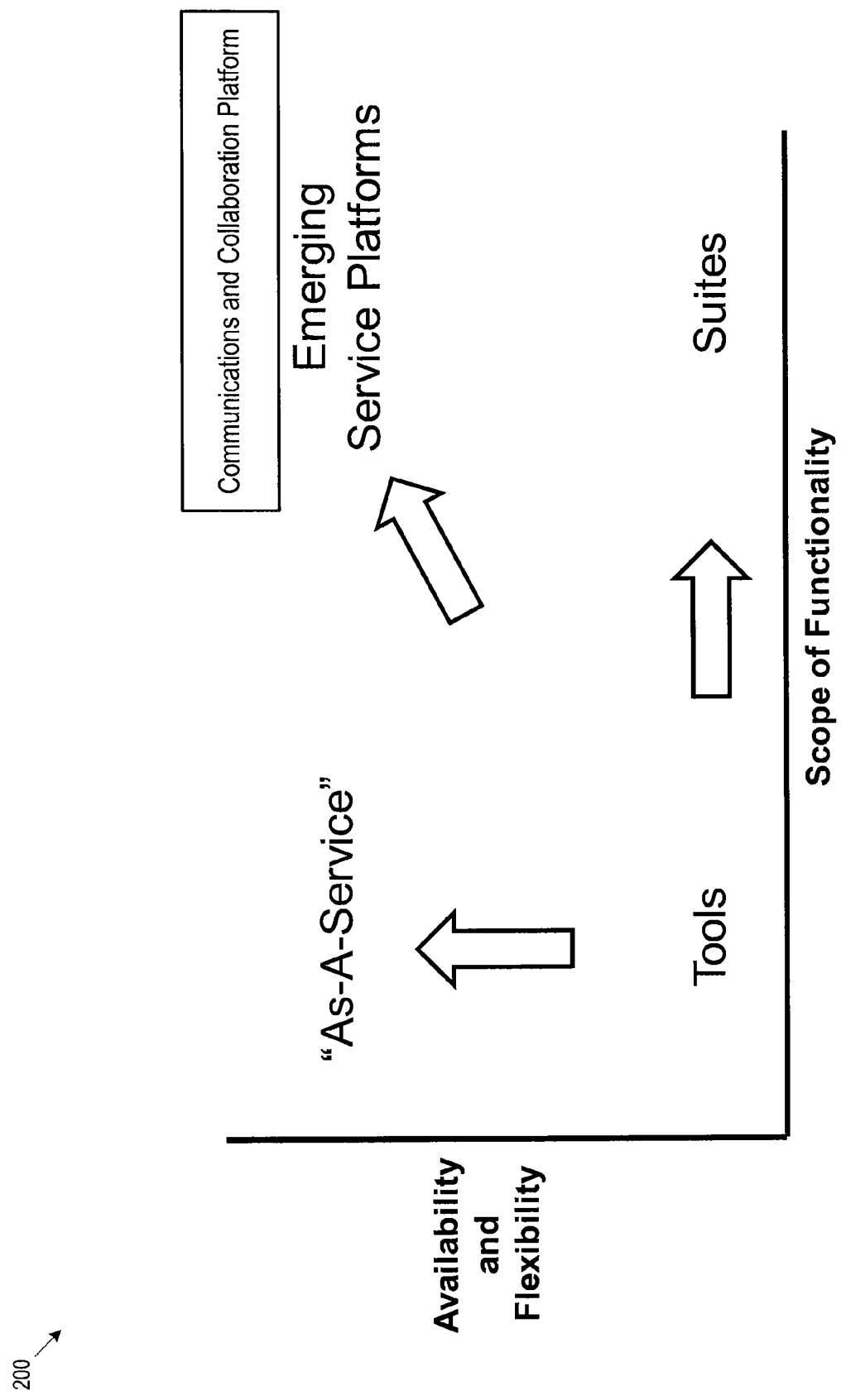
FIG. 2 shows a graph illustrating the evolution of infrastructures with respect to availability and flexibility, and scope of functionality.

FIG. 2 shows a graph 200 illustrating the evolution of infrastructures with respect to availability and flexibility, and scope of functionality. As shown in FIG. 2, the C2 Platform increases both the scope of functionality and the availability and flexibility over previous Tools and Suite solutions.

Figure 3:
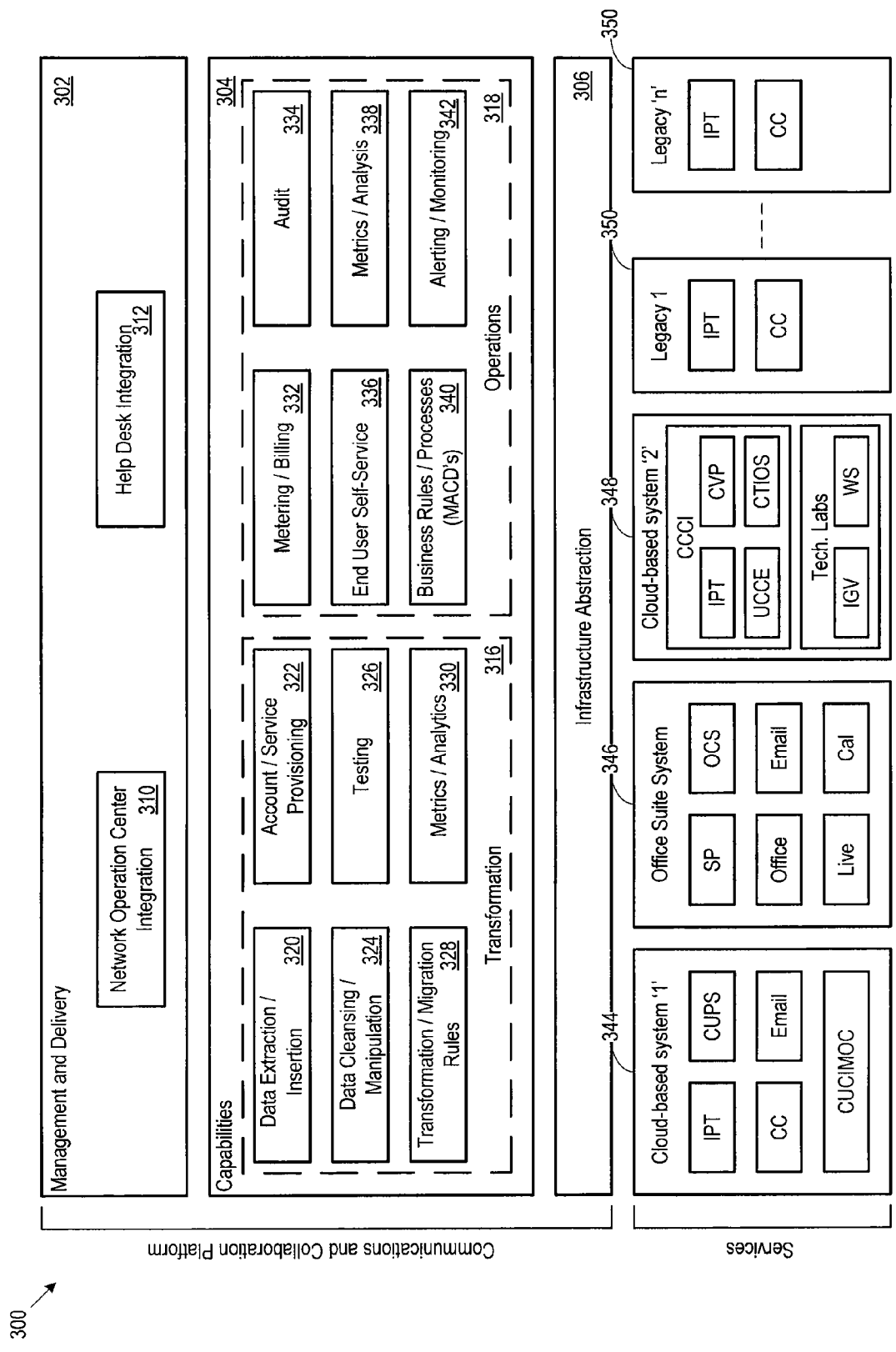
FIG. 3 shows a detailed view of the C2 Platform and the various types of systems which may be in communication with the C2 Platform.

FIG. 3 shows a detailed view 300 of the C2 Platform and the various types of systems which may be in communication with the C2 Platform. The C2 Platform may implement various functionalities. The functionalities of the C2 Platform may largely be divided into three layers: management and delivery layer 302; capabilities layer 304; and infrastructure abstraction layer 306. The management and delivery layer 302, the capabilities layer 304, and the infrastructure abstraction layer 306 may communicate with each other to provide the functionalities of the C2 Platform. These three layers may be implemented in a single system, or may be distributed across multiple systems. The management and delivery layer 302 may include the functionalities such as network operation center ("NOC") integration 310, help desk integration 312 and management 314 functionalities. The NOC integration 310 may provide information and functionalities for integrating the C2 Platform with NOCs. Using NOC integration 310, the C2 Platform may hook NOCs into the C2 Platform. For example, a NOC may need to reset or change multiple systems in communication with the C2 Platform. In such case, the NOC may use the functionality provided by NOC integration 310 to make the necessary changes to the multiple systems. Help desk integration 312 may provide information and functionalities for integrating help desk functionalities with the C2 Platform. Help desk personnel providing common trouble-shooting services may access the help desk integration 312 to make necessary changes to systems in communication with the C2 Platform to provide solutions to the trouble-shooting requests.

FIG. 3 further illustrates examples of functionalities provided by the capabilities layer 304. The functionalities in the capabilities layer 304 may be further divided largely into two groups of functionalities, for example, transformation group 316 and operation group 318. The transformation group 316 may include data extraction/insertion 320, account/service provisioning 322, data cleansing/manipulation 324, testing 326, transformation/migration rules 328 and metrics/analytics 330. The data extraction/insertion 320 may specify rules and tools to be followed and used to extract data from one system and to insert the data into another system. Account/service provisioning 322 may provide rules and functionality to follow and use for provisioning various services and corresponding accounts for a user. Data cleansing/manipulation 324 may provide rules and tools to cleanse data extracted from one system to ensure that the extracted data conforms to predetermined business rules and is ready to be inserted into the target system. Testing 326 allows the C2 Platform to perform a predefined series of tests to determine whether or not a migration/transformation has been successfully performed. Transformation/migration rules 328 may provide business rules which the C2 Platform may follow while transforming/migrating from one system to another. Metrics/analytics 330 provide tools and information to obtain metrics on the provisioned services and analyze the usage of the platform such that they may be used for billing or other purposes. One of skill in the art may find that other such functionalities may be provided by the C2 Platform without departing from the scope of the disclosure.

The operation group 318 may include functionalities such as metering/billing 332, audit 334, end user self-service 336, metrics/analysis 338, Business Rules/Processes 340, and alerting/monitoring 342. The operations group 318 may further include lightweight directory access protocol ("LDAP") integration such as, for example, Active Directory ("AD") integration (not shown). Metering/billing 332 and metrics/analysis 338 allow the C2 Platform to meter and analyze the usage of the provisioned services and provide billing functionalities. Metering/billing 332 may be implemented, for example, with a solution provided by ISI™. Audit 334 allows the C2 Platform to audit the usage of provisioned services for billing. For example, where a user has 300 licenses for a service but is in fact using 400, then the audit 334 may reveal this fact. Audit 334 may also reveal other useful information, such as, for example, the number of concurrent users per month. End user self-service 336 allows a user to perform administrative tasks on the C2 Platform. End user self-service 336 may be implemented, for example, using an administrative user portal 430. Business Rules/Processes 340 may include predefined business rules and processes which the C2 Platform may implement to provide services implemented through the C2 Platform. The business rules may include operational changes that may happen to the system, such as move, add, change and delete ("MACD"). Business rules/processes 340 may be implemented with, for example, business process management products such as, for example, Cordys™. Alerting/monitoring 342 allows the C2 Platform to monitor the activities of the various systems and issue alerts if predefined conditions are met.

Transformation group 316 and operations group 318 may further include management functionality, which may allow managers to provision and manage their own services which may be supported by the C2 Platform.

The functionalities provided by the capabilities layer 304 may be implemented, for example, using Virtual Service Exchange™ ("VSX") By Cicso™, which includes a business process management engine, a business rules engines and portals. The functionality illustrated in FIG. 3 is merely for illustration purposes. Other functionality is contemplated to allow the C2 Platform to facilitate communication between the various systems illustrated in FIG. 3.

The C2 Platform may be in communication with various systems to implement services or migrate/transform the systems. Such systems may be on-premise type systems (which may store independent tools from vendors such as Cisco™; not shown), cloud-based systems 344 (such as, for example, hosted collaboration solution systems by Cisco™), office suite systems 346 (such as, for example, the business productivity online standard (BPOS) services from Microsoft™) and/or other legacy systems 350 (from vendors such as, for example, Avaya™, Nortel™ and Cisco™).

The cloud-based system 344 may include functionalities such as internet telephony ("IPT"), Cisco™ Unified Presence Server ("CUPS"), contact center ("CC"), email such as Unity™, and desktop phone and instant messaging integration product such as Cisco™ Unified Communications Integrated with Microsoft™ Office Communicator™ ("CUCI-MOC"). The office suite system 346 may include functionalities such as knowledge management and document repository, which may be Microsoft™ SharePoint ("SP"). The office suite system 346 may further include office tools (word processors, spread sheets, etc.), office communications server ("OCS") for providing chat and instant messaging ("IM"), cloud-based services such as Live™, and calendar. One example of a cloud-based system 344 may include CCCI from Accenture™. System 348 may include functionalities such as IPT, voice portals such as Cisco™ voice portal ("CVP"), contact center solutions such as unified contact center enterprise ("UCCE") and computer telephony integration object server ("CTIOS"). System 348 may further include a community information generating system, such as Innovation Grapevine ("IGV") and White Space from Accenture™. Legacy systems 350 may include functionalities such as IPT and CC.

The infrastructure abstraction layer 306 allows the C2 Platform to communicate with external systems, such as cloud-based system 344, office suite system 346, and/or legacy systems 350. The infrastructure abstraction layer 306 abstracts data/services handled by the C2 Platform using the service definition language ("SDL") to a common informational model ("CIM"), such that data/services that are implemented using different programming languages and data models may be easily converted from one to another. CIM is described below in more detail with reference to FIG. 6.

The C2 Platform may be a single platform for both delivering and operating network transformation projects including Local Area Network ("LAN"), Wide Area Network ("WAN"), HCS, telepresence, Social Media, and Process Driven Collaboration. The C2 Platform may automate, improve, and standardize complex tasks, and may provide additional functionality for greater agility and easier management.

The functionalities provided by the management and delivery layer 302, capabilities layer 304, and services provisioned through these layers may be made accessible to third party application. In this way, third party applications may gain access to services provisioned in the underlying systems such as the cloud-based systems, office suite systems or legacy systems (communicating via the management and delivery layer 302 and the capabilities layer 304) without having to directly connect to the underlying systems individually. In other words, third party applications need to interact with only a single interface—the C2 Platform—to access the services provided by the underlying systems. Third party application accessibility may be provided by service widgets 508, which are described in more detailed below with reference to FIG. 5.

Figure 4:
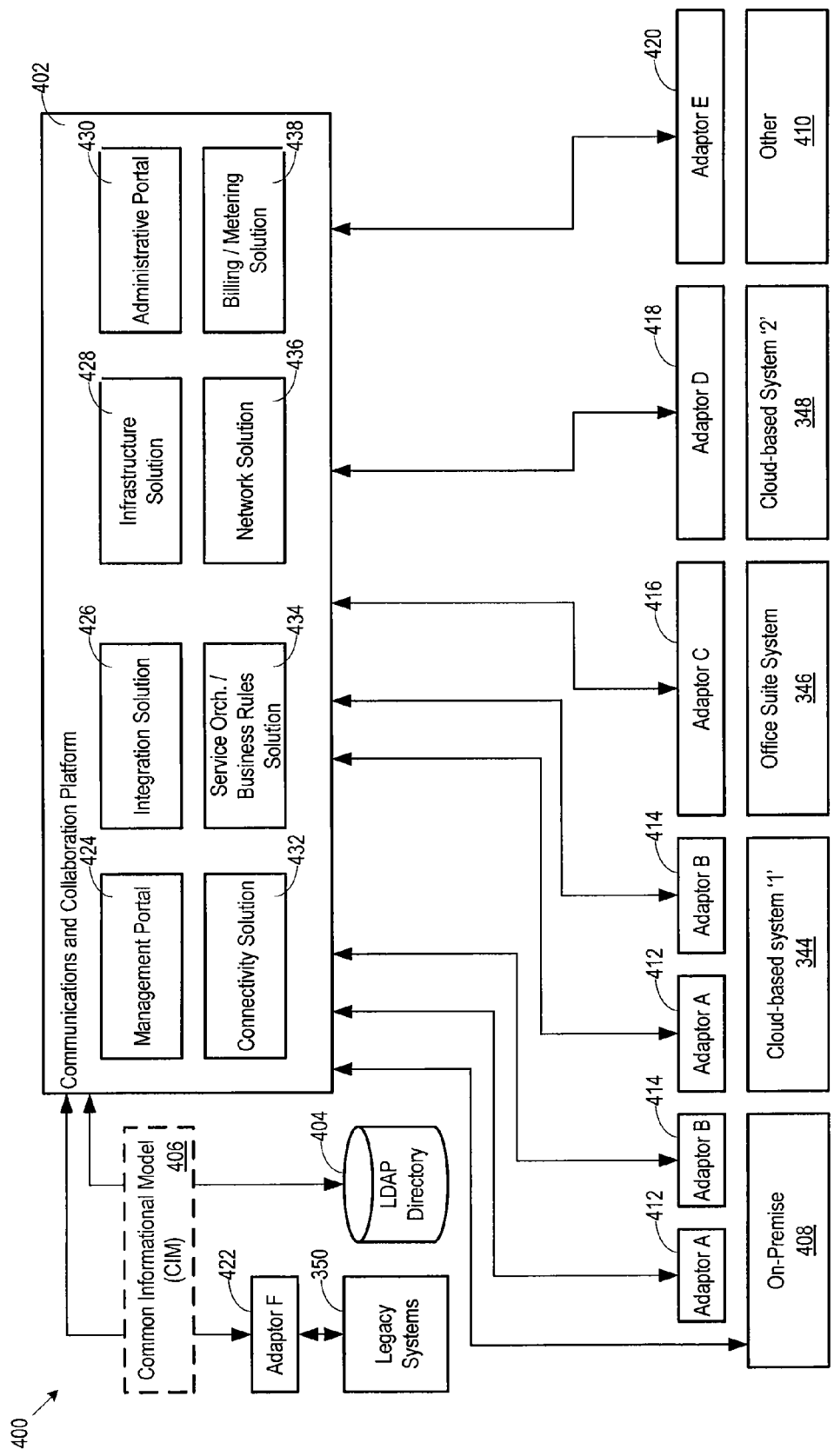
FIG. 4 shows a view of the C2 Platform and its relationship with other systems which may be in communication with the C2 Platform.

FIG. 4 is a diagram 400 showing another detailed view of the C2 Platform and its relationship with other systems which may be in communication with the C2 Platform. The C2 Platform 402 may be in communication with legacy systems 350 and an LDAP directory 404 such as an Active Directory ("AD") using the common informational model ("CIM") 406. CIM 406 is a data model which describes the services supported by the C2 Platform. By converting extracted services into the CIM 406 and using adaptors which may translate services provisioned on different systems into CIM, the C2 Platform may efficiently communicate with different systems. Service Definition Language ("SDL") may be used to convert the services to and from CIM 406. The CIM 406 is described in more detail below with reference to FIG. 6.

The C2 Platform 402 may also communicate with various systems such as on-premise system 408, cloud-based system 344, office suite system 346 and other systems 410 via adaptors. Adaptors translate communications between the C2 Platform (which may use CIM) and the various systems (which may use data model other than CIM for implementing services). Some adaptors, for example adaptors A 412 and B 414, may be compatible with multiple types of management solutions for running various systems. For example, adaptor A 412 may support United Customer Management Solutions ("UCMS") which may be compatible with on-premise systems 408, and cloud-based system '1' 344. Adaptor B 414 may support system management solution provided by VOSS™. Adaptor B 414 may also be compatible with on-premise system 408 and cloud-based system '1' 344. Adaptor C 416 may support a native management solution for running a specific office suite system 346 such as BPOS. Cloud-based system '2' 348 may only be compatible with an adaptor D 418 supporting a system management solution by Exony™ Other systems 410 may also only be communicable via adaptors supporting their own native system management solutions, such as Adaptor E 420. The C2 Platform may also be implemented to communicate directly with predetermined systems without any adaptors. Further, an adaptor F 422 may be provided to convert extracted data into the CIM 406.

FIG. 4 further illustrates the solutions used by the C2 Platform for implementing the functionalities described in the capabilities layer 304. A management portal 424 may be used so that end users may control the provisioning and management of their own services supported by the C2 Platform. Also, integration solution 426 such as SDL may be used so that the C2 Platform may connect to and convert data to and from legacy and other systems. As discussed above, SDL may be used to convert the services of the various systems into a CIM. An infrastructure solution 428 may be used to manage the provisioning and decommissioning of server infrastructure hosting the C2 Platform. An example of the infrastructure solution 428 may be a Cloud Enterprise Services™ ("CES"). Administrative portal 430 may be also provided. A user may access the administrative portal 430 to access the functionality, such as end user self-service 336. Connectivity solution 432 may be used to provide secure connectivity into the C2 Platform from various systems without a need for a dedicated connection such as Multiprotocol Label Switching ("MPLS"). One example solution may be Corente™. A service orchestration and business rules solution may be used to provide the functionality such as business rules/processes 340. One example solution may be a business process management solution such as Cordys™. A network solution may be used to interface with any networking hardware. The C2 Platform may interface with the network solution to communicate with the networking hardware. Such a solution may be, for example, Voyence™. Billing and metering solution may be used to provide functionality such as, for example, metering/billing 332. Such a solution may be, for example, ISI™.

Figure 5:
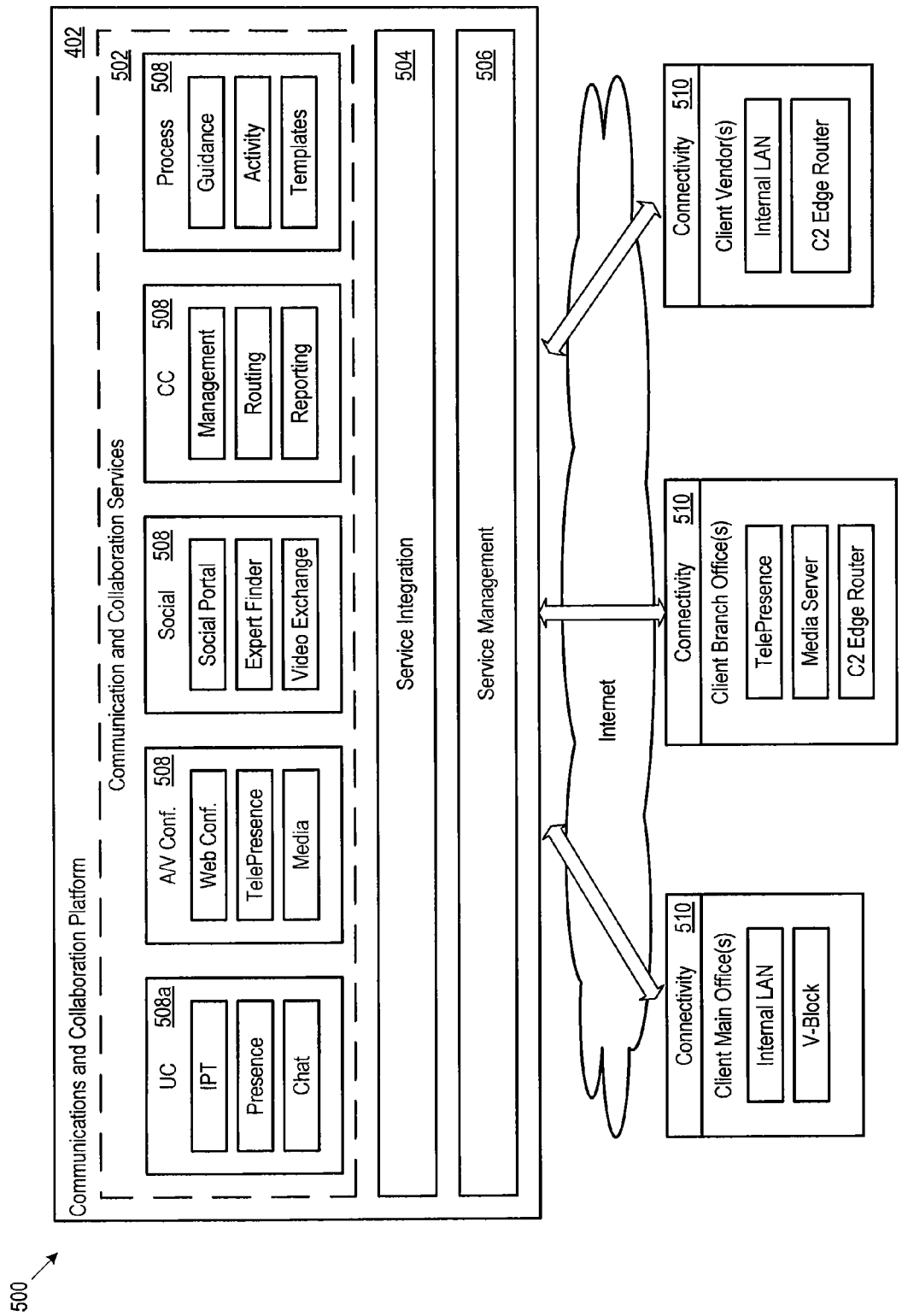
FIG. 5 is a diagram showing different layers implemented in the C2 Platform and the various types of systems which may be in communication with the C2 Platform.

FIG. 5 is a diagram 500 showing different layers implemented in the C2 Platform 402 according to an embodiment and also showing the various types of systems which may be in communication with the C2 Platform. The C2 Platform 402 may provide the communication and collaboration services layer 502, service integration layer 504, and service management layer 506. Communication and collaboration services layer 502 allows the C2 Platform 402 to provide the best of collaboration capabilities securely available according to business demands. The communication and collaboration services layer 502 allows collaborating the services provided by various systems such as cloud based systems 344 and 348, office suite system 346 or other systems to third party applications and users through service widgets 508.

The service integration layer 504 provides the framework and libraries for connecting services such as cloud and premise based communication and collaboration products to the service management layer 506 and for running them on a network connection layer. The framework and libraries may act as an interface for connecting individual services, such as HCS, into the service management layer 506. The service management layer 506 provides the automation, processing and orchestration that may bring the majority of delivery and operational savings and risk management allowed by the C2 Platform. The service management layer 506 accelerates deployment and provides a simplified interface for complicated composite operational changes.

As shown in FIG. 5, the C2 Platform 402 may include one or more embedded tools or service widgets 508 such as, for example, unified communications ("UC"), A/V conferencing, social tools, contact center ("CC") and process tools. Service widgets 508 are bundles of functions for providing services. These functions may be abstracted from the underlying systems that are actually implementing the services. For example, these bundles of functions may be defined in CIM 406, and may represent, in abstracted forms, the actual services implemented in the underlying systems. In an embodiment, service widgets 508 may be implemented in SDL. Using SDL, the C2 Platform may read the functions defined in CIM 406 and translate the functions such that communication with the underlying systems is made possible. In other words, CIM 406 allows the C2 Platform to abstract the services provided by different underlying systems into a single data model such that the C2 Platform may efficiently manage these services without worrying about the different protocols or syntaxes the underlying systems may use.

Service widgets 508 may be hosted on the C2 Platform, and may represent various business functions or services. For example, the service widget 508a may be a bundle of functions which together represent a UC service. Third party applications wanting to use the UC services may simply access the C2 Platform to call the service widget 508a to utilize the UC services, rather than having to access the system actually hosting the UC services. Third party applications may likewise access the C2 Platform and call the service widget corresponding to the necessary services to use those services. Therefore, the service widgets 508 allow the third party applications to access the required services simply by connecting a single interface—the C2 Platform—for all the desired services, rather than individually connecting to the underlying systems for each service.

Business rules may define which specific functions are included in the bundle to form a specific service represented by a service widget 508. The business rules may also define which systems are actually implementing the functions of the service widget 508. In the example of the UC service represented by service widget 508a, the functions of the serviced widget (IPT, Presence, and Chat) may be implemented in separate systems such as on-premise, cloud-based, office suite, or legacy systems. However, when a third party application calls the service widget 508a, the C2 Platform 402 may handle the necessary communications with these systems based on the business rules to provide the services of the service widget 508a. In this way, the third party application does not need to worry about communicating with the underlying systems on which the actual UC services are implemented.

The service widgets 508 may be configured by the business rules such that a certain type of service or a function of the service may be implemented at a certain underlying system. For example, the business rules may require that the IPT function of the service widget 508a be provided by a cloud-based system such as HCS. The business rules may also require that the chat function may always be provided by an office suite system such as BPOS. However, a manager may change such configuration by changing the business rules. A management portal 424 may be used to make such change in configuration. For example, a dropdown menu may be provided at the management portal 424 in which the manager may select an available underlying system which may implement a certain type of service. For example, where the IPT function has been previously configured to be implemented on a first type of cloud-based system HCS, the manager may be able to select a second type of cloud-based system such as, for example, CCCI, as the new system implementing the IPT function. Such selection may be done by accessing the management portal and selecting the menu "CCCI" from a dropdown menu showing a list of available systems for implementing the IPT function. When selection for a new system to implement the IPT function is made, configuration is changed such that the C2 Platform communicates with the newly selected system (CCCI in the above example) for the IPT functions instead of the existing system (HCS in the above example). At the same time, business rules may trigger a migration logic such as one described with reference to FIG. 8 below, in case the change in configuration requires data to be migrated to the new system. In the example above, the change in the system providing the IPT function may require migration of data such as user information and telephone numbers to the new system. In such case, the migration logic may transfer the user information and telephone numbers to the new system.

The C2 Platform may further include the network connection layer, or connectivity layer 510. The connectivity layer 510 allows a business as well as its partners and suppliers to connect to the C2 Platform through a secure and regulated channel by using hardware and/or software such as, for example, an appliance, router, or installed gateway software. This connection allows secure communications, remote diagnostics and the ability to download additional collaboration software into local environments. Connectivity to the C2 Platform may be Health Insurance Portability and Accountability Act and Sarbanes-Oxley Act ("HIPAA/SOX") compliant and may ensure that data is completely secure.

Collectively, these layers provide automation, standardization, and improved communication between different systems. For example, on a deployment of a cloud-based system such as HCS, the C2 Platform may transfer information from legacy PBX infrastructure to new Call Managers, automatically cleanse data by comparing to payroll and a master record such as AD records, automate testing, and allow most work to be performed off-site. Operationally, the C2 Platform may provide the interface to more efficiently handle add/change/remove requests and quickly detect outages and quality issues.

In addition to (or instead of) the functionality described above, the C2 Platform may facilitate services being run and managed either on or off premise or as a combination of both. As an example, solutions which may be required or preferred to be on premise, such as TelePresence™, or those which a business requires or prefers to be on premise, such as Contact Center, may be installed locally but remotely managed and operated through the C2 Platform via network operation centers ("NOCs"). In the case where Contact Center or other applications are run locally because of business requirements or preferences, they may be transferred directly to off premise infrastructure through the C2 Platform if business requirements or preferences change. Further, the C2 Platform may allow the business to add additional services on demand through a service catalog. For instance, a business might not currently require solutions such as, for example, Cisco's Expert Advisor™ for Call Centers or Accenture's Collaborative Innovation Solution™ ("ACIS") for crowd sourced idea generation. These changes may be made using the management portal 424. Thus, using the C2 Platform, these solutions may quickly be provisioned and managed as business requirements or preferences change. Finally, the C2 Platform may provide the libraries and capabilities necessary to embed these capabilities directly into business processes and applications.

Figure 13:
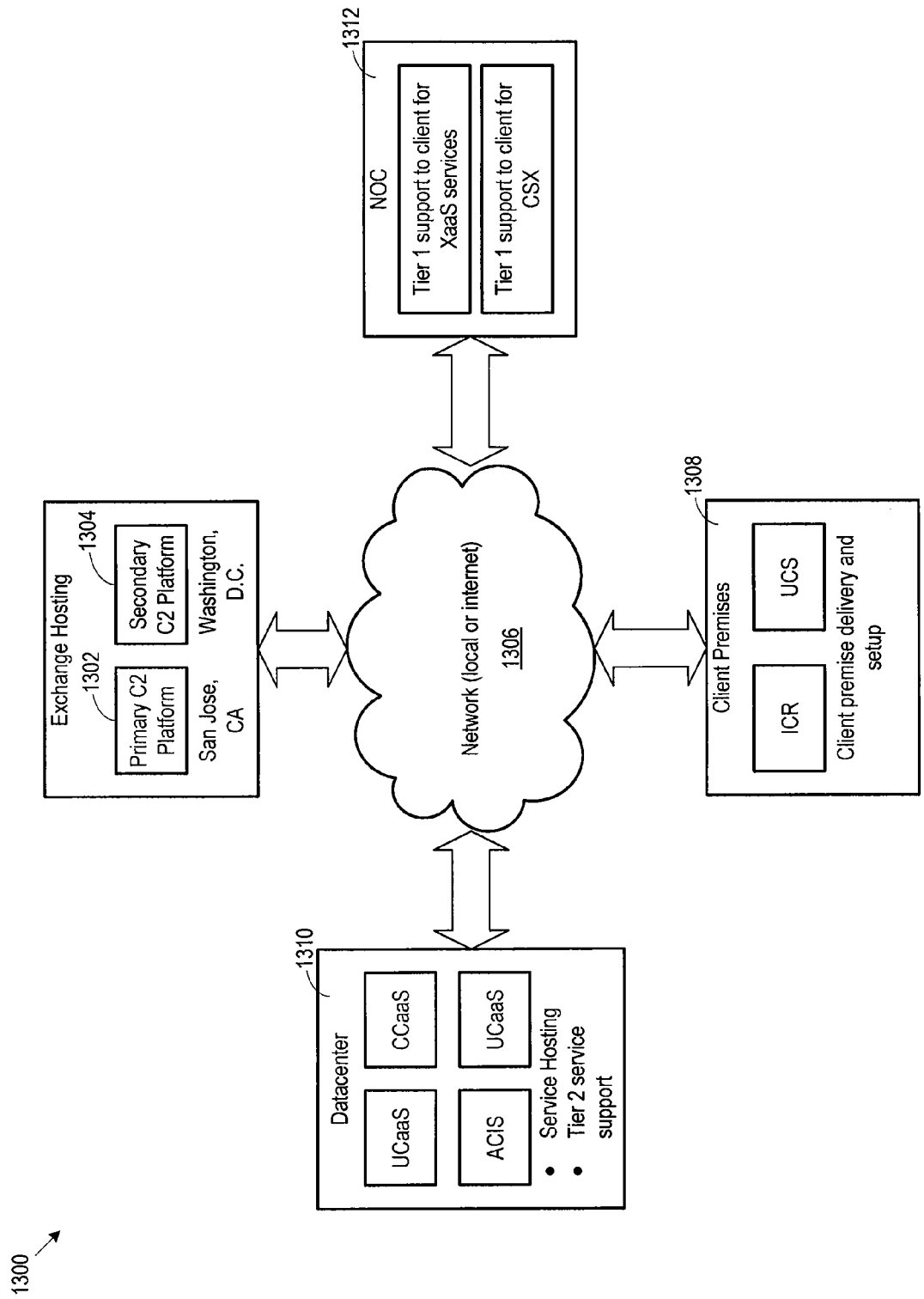
FIG. 13 shows a diagram illustrating an exemplary implementation of C2 Platform.

FIG. 13 shows a diagram 1300 illustrating an exemplary C2 Platform operating model.

The C2 Platform may be hosted in a single site or in multiple sites. For example, a primary C2 Platform 1302 may be hosted in San Jose, Calif., while a secondary C2 Platform 1304 may be hosted in Washington, D.C. One or both of C2 Platform 1302 and C2 Platform 1304 may be in communication with client premises 1308 through the Internet via Internet Service Providers ("ISPs") 1306. Services such as Interactive Call Routing ("ICR") may be implemented at the client premises 1308 and may be in communication with the C2 Platform. The client premises 1308 may use servers such as Unified Compute System ("UCS") by Cisco™. In an embodiment, systems or adaptors may be installed on the client's on-premise systems to be compatible with the C2 Platform. The C2 Platform may also communicate with a datacenter 1310, which may host services delivered to clients, various XaaS ("anything as a service") services such as, for example, unified communications as a service ("UCaaS"), converged communication as a service ("CCaaS"), and Accenture™ collaborative innovation solution ("ACIS"). The datacenter 1310 may also provide a Tier 2 service support, support from someone with mid-level technological understanding who can help trouble shoot problems. The C2 Platform may further be in communication with a NOC 1312 through the network 1306. The NOC 1312 may provide Tier 1 support to users for XaaS services and the C2 Platform. Tier 1 support is support from a help desk person, for example someone with an entry level technological understanding who may provide support for basic and/or common issues.

Figure 6:
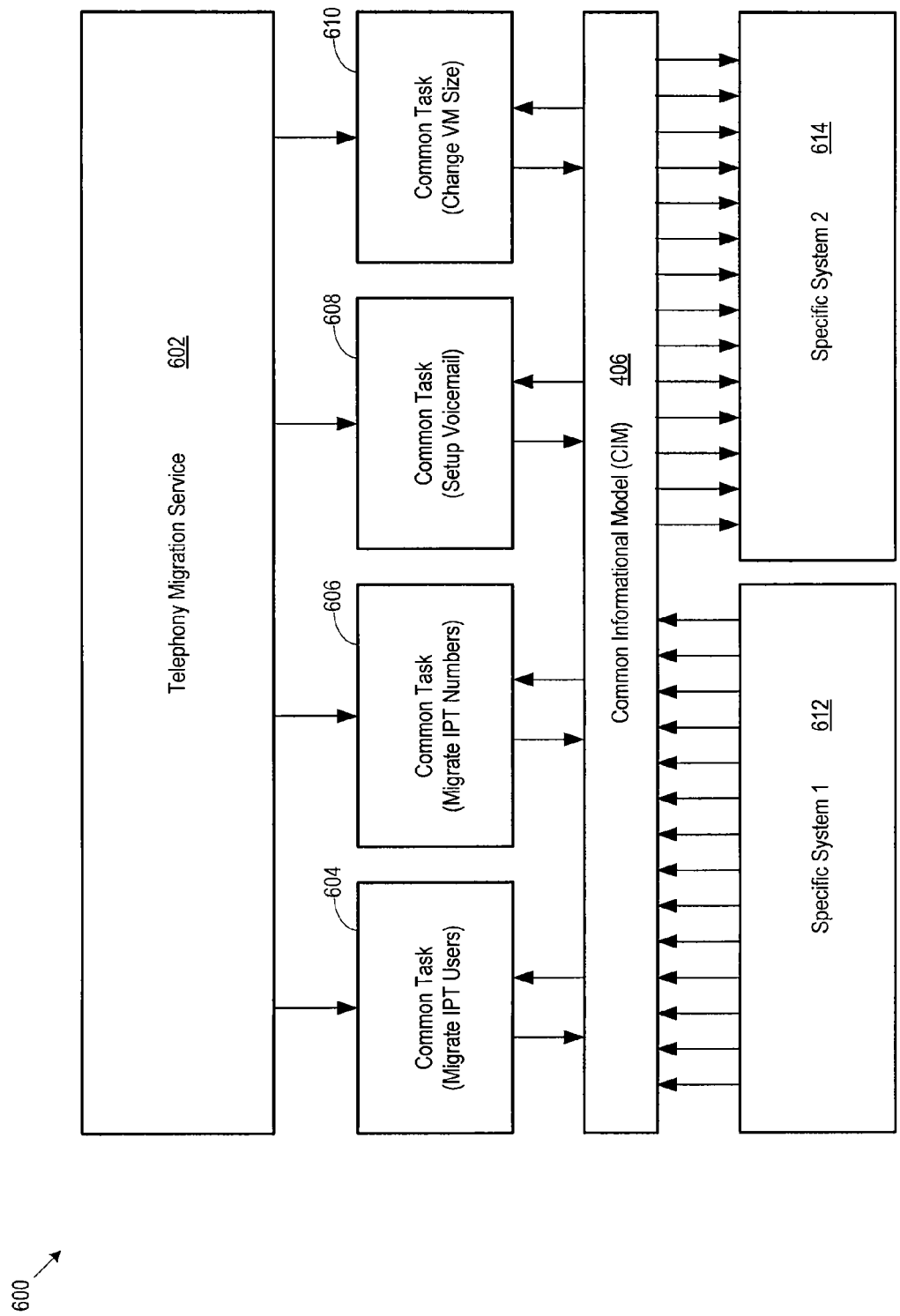
FIG. 6 is a diagram showing the transformation of data/functionalities of one system to another by the C2 Platform using the Common Informational Model ("CIM").

FIG. 6 shows a diagram 600 illustrating how services supported by the C2 Platform are defined in the C2 Platform. Specifically, diagram 600 shows a specific example of a telephony migration service 602 which migrates telephony services from a system of client "X" to a new system. As discussed above, the C2 Platform may represent supported services as service widgets 508. Therefore, the telephony migration service 602 may be a service widget 508. For example a third party application may access the C2 Platform to call the telephony migration service 602 to initiate a migration of telephony services from one system to another.

The telephony migration service 602 may be defined to execute a series of common tasks in order to migrate the telephony services from a system of client "X" to a new system. These common tasks may be, for example, "migrate IPT users" 604, "migrate IPT numbers" 606, "setup voice mail" 608, and "change voice mail size" 610. The migration service 602 may call these common tasks in series to execute the tasks. These common tasks 604-610 may be defined in CIM 406. Different services supported by the C2 Platform may be similarly defined such that common tasks supported by the different services are all defined in CIM 406. In an embodiment, the service definition language ("SDL") may be used to translate the tasks defined in CIM 406 to a format understandable by the underlying systems and execute the tasks. However, any other programming languages may be used.

As the common tasks 604 and 606 are executed, data may be migrated from one system (specific system 1 612) to another (specific system 2 614). For example, the common task 604 may define instructions for migrating the IPT users from system 1 612 to system 2 614. The instructions may include extracting the IPT user data from system 1 612, processing the extracted IPT user data and inserting and inserting the processed IPT user data into the system 2 614. Similar instructions may be defined for common tasks 606 to migrate the IPT numbers. SDLs may translate the tasks defined in CIM 406 to communicate with system 1 612 and system 2 614 and execute these tasks. Similarly, SDL may translate the tasks 608 and 610 to communicate with system 1 612 and system 2 614 and execute the tasks.

Figure 7:
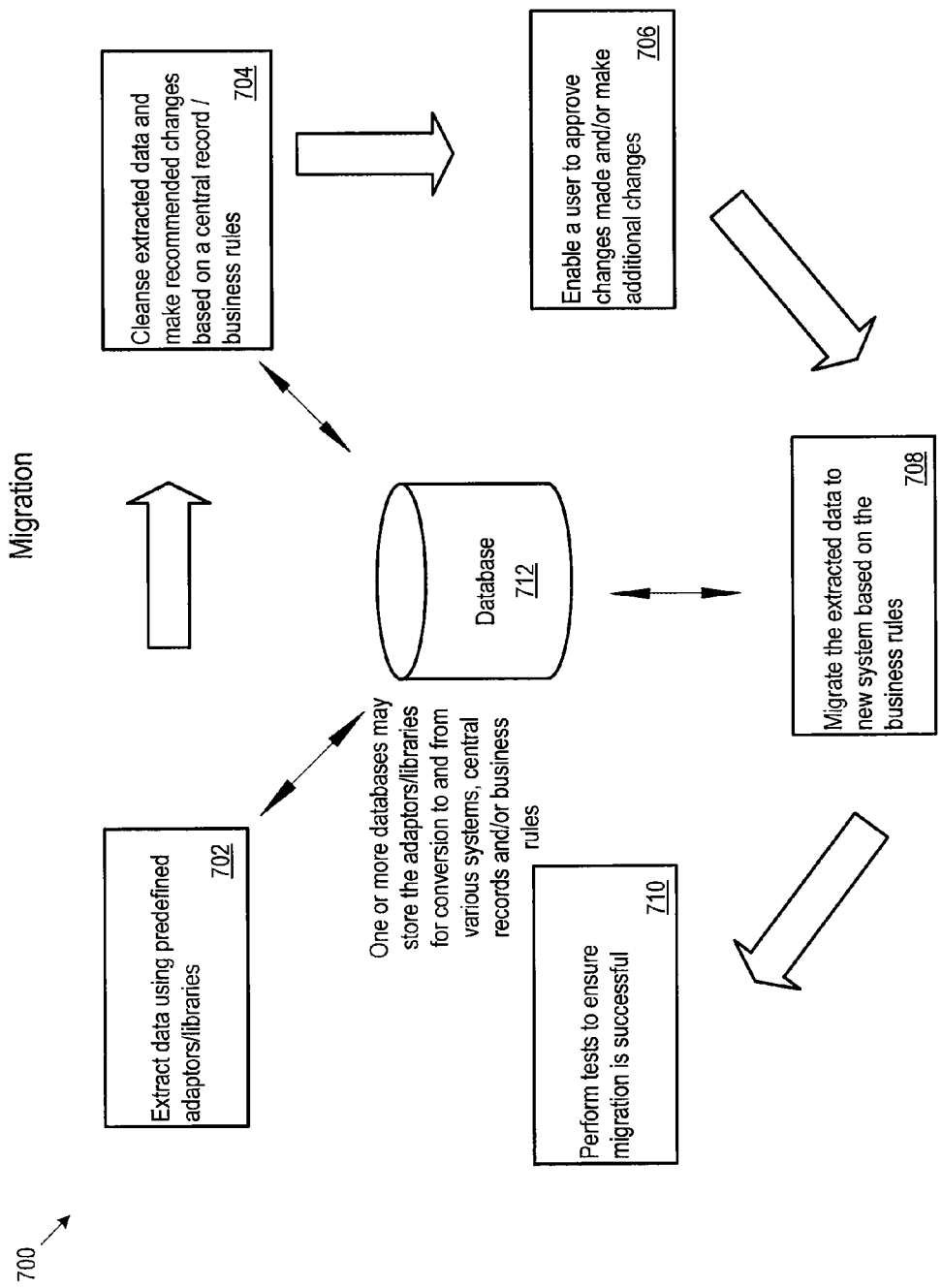
FIG. 7 shows a flow diagram of a migration/transformation functionality provided by the C2 Platform.

FIG. 7 shows a flow diagram 700 of migration functionality provided by the C2 Platform. The C2 Platform may extract data from a system using predefined adaptors or libraries, such as adaptor F 422 (702). The adaptors or libraries may be stored in a database 712. The extracted data may be checked against a master record, such as, for example, an LDAP directory which the C2 Platform may access. The LDAP directory may also be stored in the database 712. Alternatively, the LDAP directory may be stored in a separate database. The data may be cleansed relative to the master record and recommended changes may be made based on the comparison and business rules (704). A user, such as a consultant, may review the changes made at 704 and approve or disapprove the changes, and may make other additional changes (706). The approved data may then be migrated into the target system or systems determined based on the business rules (708). After the migration, the C2 Platform may perform a series of automated tests to ensure the migration is successful (710). In an embodiment, the testing functionality 326 may be used for the testing at 710.

Through the above functionality, the C2 Platform may automate and improve many of the manual steps in large scale network transformations, such as a telephone network, from comparing existing dial plans against a master record, performing network changes and updates, to testing a successful migration. For example, a consultant may enter a portal provided by the C2 Platform and select a migration package for the client business, entering in basic client information. Once the new client engagement is created, the consultant may step through the billing process built into the C2 Platform. After entering the relevant billing information, the consultant may then begin to define the migration process. Once the migration process begins, the telephone automatically reboots and begins the process of migrating to a new common entry instance. The migrating phone is not simply switching from one system to another. The C2 Platform may actually remove information from the legacy system, compare it with the master list, format the information into the new format, and upload the configuration.

Figure 8:
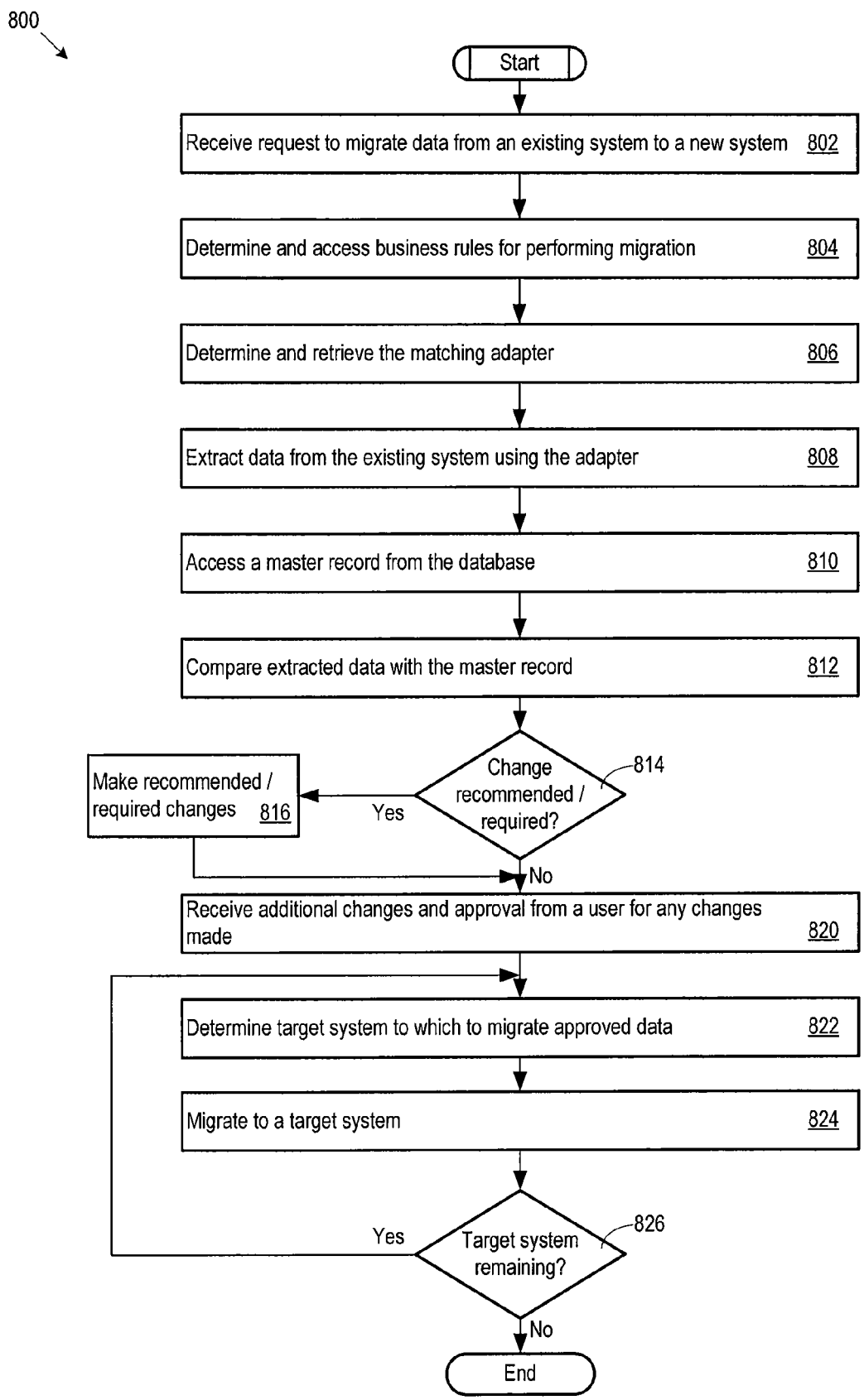
FIG. 8 shows a flow diagram of logic that the C2 Platform may follow in performing the migration/transformation functionality.

FIG. 8 shows a flow diagram 800 of migration logic that the C2 Platform may follow in implementing the migration functionality. The migration logic may be stored in a memory and may be executed by a processor. The memory may be located locally with or within the C2 Platform or may be stored remotely and accessible through a network. The migration logic may be incorporated within the transformation/migration rules 328 described with reference to FIG. 3, implemented as a separate business rule stored in the database 712, or as other types of computer instructions stored in a computer readable memory. The following paragraphs describe the migration logic in detail.

The C2 Platform may receive a request to migrate data from an existing system to a new system (802). The existing system may be a legacy system or any other type of system. For purposes of explaining the migration logic, the existing system will be referred to as a previous system, and the new system to which to migrate will be referred to as a target system. The target system may be a single system or may be multiple systems. Next, the C2 Platform may determine and access business rules for performing the requested migration (804). The business rules accessed may be the transformation/migration rules 328, or a separate business rule stored in the database 712. Based on the business rules, the C2 Platform may determine and retrieve a matching adaptor, an adaptor which may translate the communication to the target system (806). The matching adaptor may be retrieved from a local memory or from a database. The database may be, for example, the database 712.

Using the adaptor, the C2 Platform may extract data from the existing system (808). The extraction may be performed by pulling the data from the existing system using the adaptor. Next, the C2 Platform may access a master record with which to compare the extracted data (810). The master record may be an LDAP directory 404, such as an AD. Next, a comparison is made between the extracted data and the master record (812). Based on the business rules or other predetermined criteria, the C2 Platform may either recommend, or require changes to be made to the extracted data (814). If changes are recommended or required, the C2 Platform may make the required changes (816). The C2 Platform may also allow a user to review the result of the comparison made during step 812 and manually make the recommendations or requirements to change data. After making any changes during step 816 or if no changes are recommended or required, the C2 Platform may receive additional changes to be made to the extracted data (820). For example, a user may wish to customize extracted data so that it does not comply with the master record or predefined business rules. In such a case, the C2 Platform may allow the user to make additional changes to allow for such customization. Further, the user may be allowed to approve or reject changes and/or recommendations automatically made by the C2 Platform. Next, one or more target systems, to which the extracted data will be migrated to, are determined (822). The target system may be a single system, or may be multiple systems. In the case of multiple target systems, how the data will be distributed among the target systems may also be determined. Next, data are migrated to a target system (824). Afterwards, in the case of multiple target systems, the C2 Platform may determine whether any additional target systems are remaining to which to migrate the data (826). If target systems remain, the migration logic is repeated from step 822. If no target systems are remaining, the migration logic ends.

Figure 9:
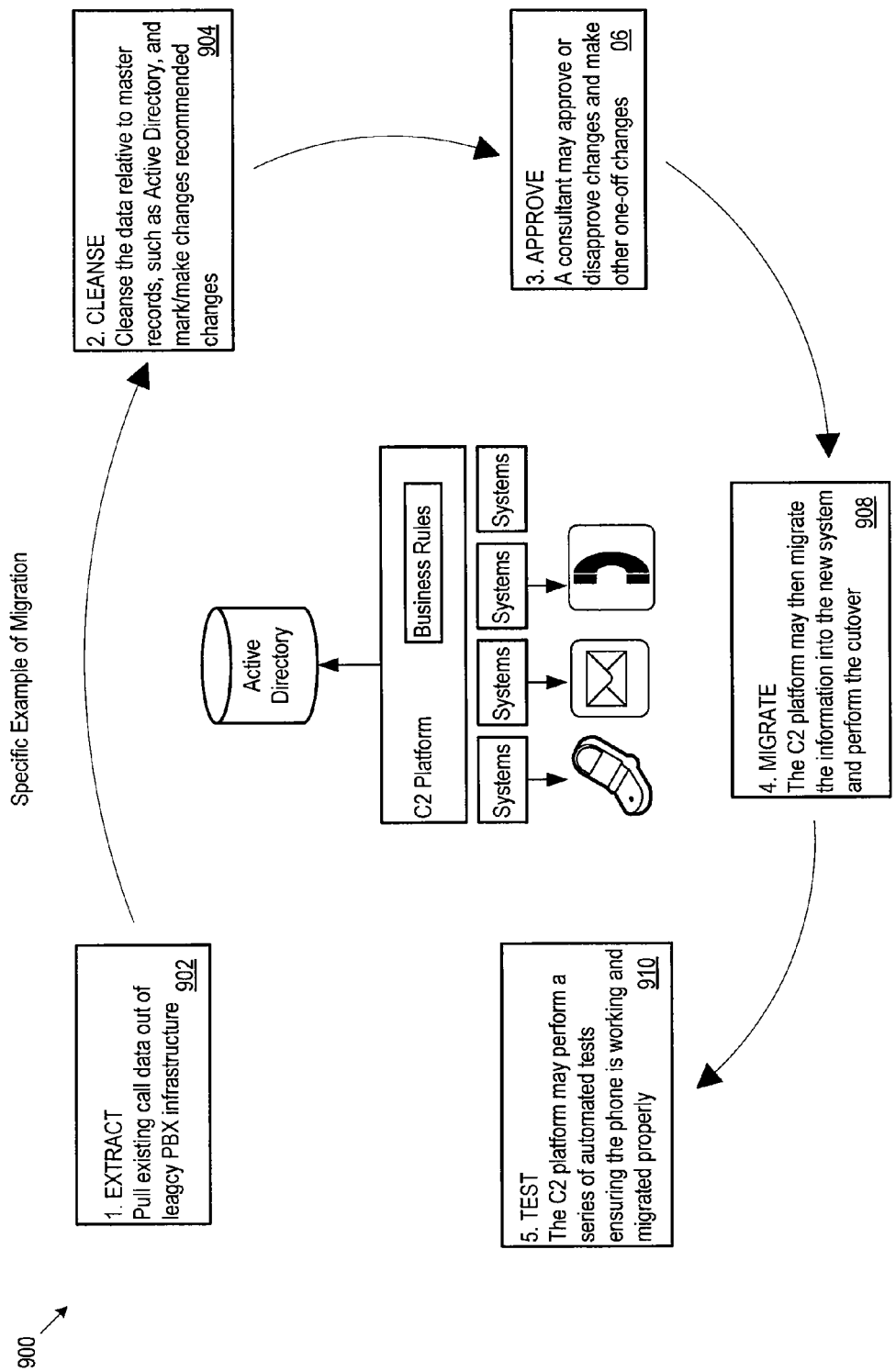
FIG. 9 shows a flow diagram of an exemplary migration of call data of a legacy private branch exchange ("PBX") infrastructure to another system.

FIG. 9 shows a flow diagram 900 of an exemplary migration of call data of a legacy private branch exchange ("PBX") infrastructure to another system. First, existing call data may be extracted from a legacy PBX infrastructure (902). The extracted data may be cleansed relative to a master record. The master record may be an LDAP directory such as an active directory ("AD"), and recommended changes may be made or marked (904). After the data is cleansed, a consultant may approve or disapprove the changes and may further make other one-off changes (906). After the data is approved, the data may be migrated to another desired system or infrastructure (908). After the data is migrated, the C2 Platform may perform a series of automated tests to ensure that the phones are working and data was migrated properly (910). In addition to or in the alternative to automated testing, the consultant may check whether the migration was successful by performing a call to check connectivity.

The C2 Platform may also provide a portal interface allowing end users to manage their own move, add, change, and/or delete requests. In the telephony context, users can create new phone lines, change existing phone lines, update configurations, and other requests.

Figure 10:
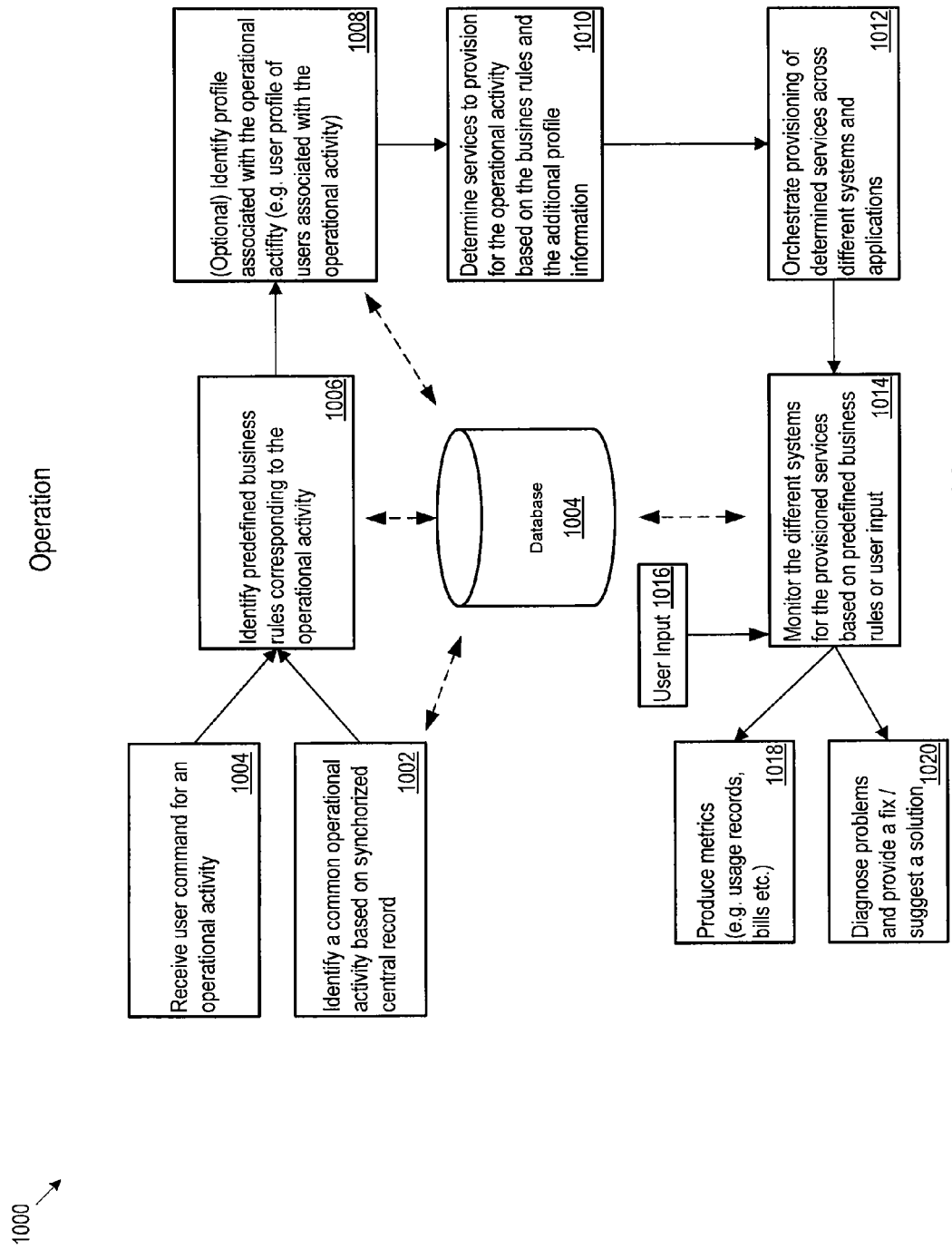
FIG. 10 shows a flow diagram of an automated common operational activity.

FIG. 10 shows a flow diagram 1000 of an automated common operation which may be performed by the C2 Platform.

The C2 Platform may identify a common operational activity based on a synchronized central record, such as, for example, an LDAP directory (1002). This LDAP directory may be an AD. Alternatively, the C2 Platform may receive a user command for a common operational activity (1004). Common operational activities may be, for example, adding one or more employees to the AD, promoting an employee, and removing an employee from AD. Next the C2 Platform may identify a predefined business rule corresponding to the common operational activity of steps 1002 or 1004 (1006). The C2 Platform may optionally identify a profile associated with the operational activity (1008). The profile may be, for example, user profiles of users associated with the operational activity. The profile may include information about a user and specific services which may be provisioned for or provided to the user. Next, the C2 Platform determines the services to provision based on the identified business rules and any additional identified profiles (1010). For example, if a profile is identified, the business rules may cause the C2 Platform to examine the profile to determine if the profile specifies additional services to provision. The AD, business rules, and the profile information may be stored in a database 1004. The C2 Platform orchestrates the provisioning of the services determined in step 1010 across different systems (1012). Depending on the business rules, the systems involved may be a single system or multiple systems. After the services are provisioned, the C2 Platform may additionally monitor the services based on predefined business rules (1014). In addition to the business rules or in the alternative, the C2 Platform may monitor services based on a user input 716. Based on the monitoring performed by step 1014, the C2 Platform may produce metrics, such as usage records, bill, etc. (1018). The C2 Platform may also diagnose problems and provide a fix (1020). If a fix may not be immediately provided by the C2 Platform, suggestions for a solution may be provided to the user.

Figure 11:
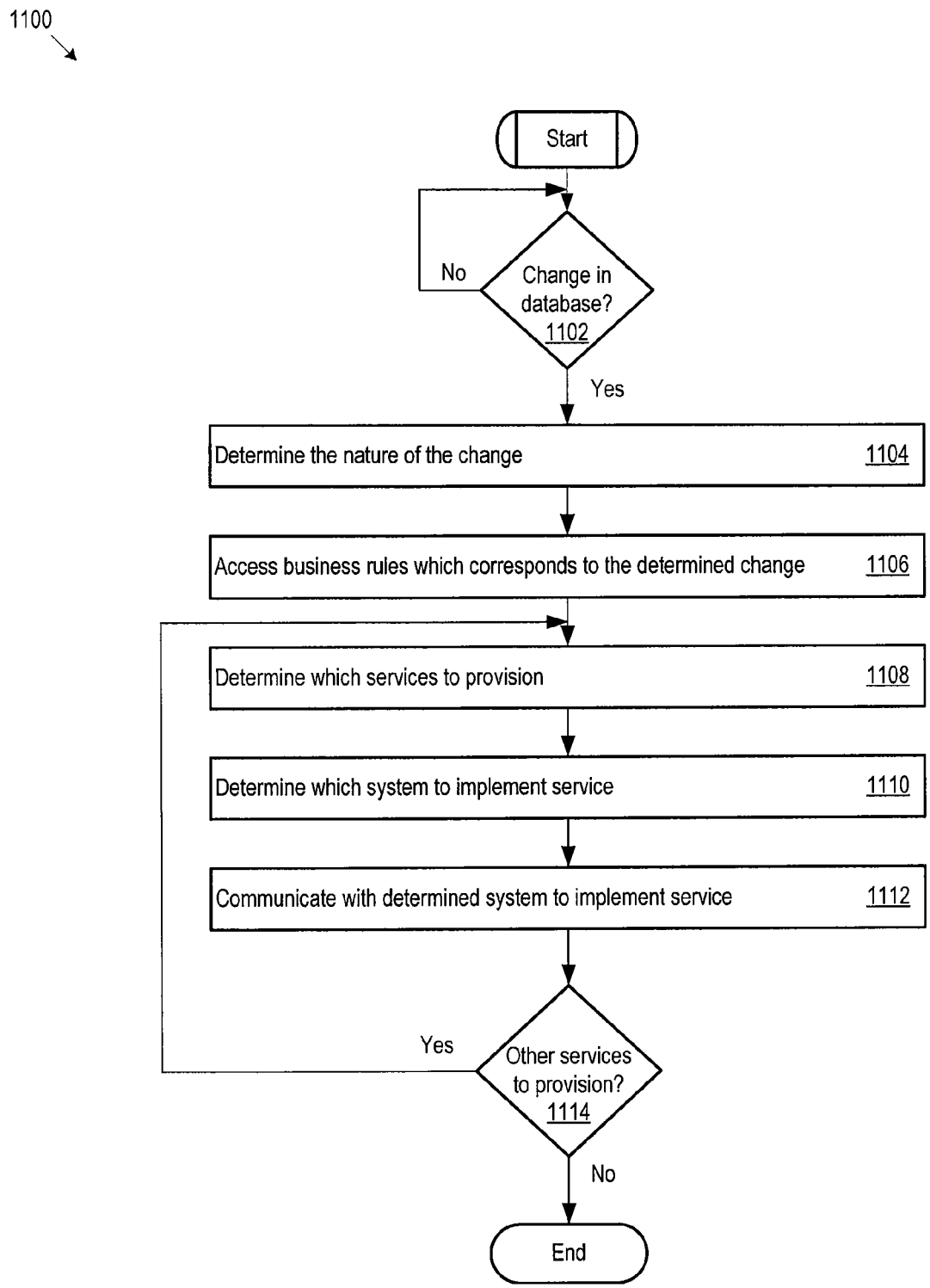
FIG. 11 shows a flow diagram of logic that the C2 Platform may follow in performing an automated common operational activity.

FIG. 11 shows a flow diagram 1100 of operation logic that the C2 Platform may follow in carrying out the operation functionality.

The operation logic may be stored in a memory and may be executed by a processor. The memory may be located locally with the C2 Platform or may be stored remotely and accessible through a network. The operation logic may be incorporated with the business rules/processes 340 described with reference to FIG. 3, may be implemented as a separate business rule stored in the database 712, or as other types of computer instructions stored in a computer readable memory. The operation logic is described in detail below.

The C2 Platform may detect a change made in a database (1102). The database may be an LDAP directory such as AD. As discussed above with reference to FIG. 10, the AD may be synchronized with the C2 Platform such that changes may be easily detected. The C2 Platform may periodically monitor the database or receive notification from the database if a change is made to the database. If a change is detected, the C2 Platform may determine the nature of the change (1104). The nature of the change may be, for example, an insertion of an entry, a removal of an entry, or a modification of an entry in the database. The nature of the change may further include the type or contents of entries inserted or removed. The C2 Platform may access business rules which may correspond to the determined nature of the change (1106). The business rules may be, for example, the business rules/processes 340. Specifically, the database may be changed to add a new employee, remove an employee, or to change one or more aspects of an employee (such as change in position, title, work hours, salary, phone number, email address, etc.).

The change may also be to one or more business rules. For example, a rule may specify a change to an existing service. In particular, the rule change may specify that a certain group (e.g., all attorneys) receive a change in a currently provided service (such as increasing the maximum amount of e-mail storage from 100 MB to 200 MB). The C2 platform may review the user profiles for one, some, or all of the employees to determine which of the user profiles are affected by the rule change (such as which profiles include a tag indicating the employee is an attorney). As another example, a change may be made to the rules such that a new service is provided or an old service is removed. In particular, the rule change may specify that attorneys not receive IM service in addition to phone and email.

Next, the C2 Platform may determine which services to provision (1108). The determination may be made based on the nature of the determined change and the business rules accessed in step 1106. The C2 Platform may further determine which system or systems to implement the services determined in step 1108 (1110). The determination in step 1110 may be made based on the nature of the determined change and the business rules accessed in step 1106. For example, if the change is an addition of an employee, the business rules may specify that the employee receive email, IM and telephone service. Based on this rule, systems for provisioning the email, IM and telephone services may be determined such that the necessary services may be set up for the added employee in step 1112. As an example, the C2 platform may determine that a new employee has been added based on a new user profile being added to the system. The user profile may directly indicate the services to provide the new user (such as telephony, e-mail, etc.). Or, the user profile may indirectly indicate the services to provide the new user (such as indicating at least one aspect of the new user, such as a job title, with the job title indicating the services to provide the new user). One or more databases may further indicate which systems the C2 platform accesses to provide the services. For example, a particular new user may work for Company "X". A look-up table may be used to determine which systems to provide for employees of Company "X".

In the example of a change in the business rules, when the rule is changed so that the attorney now receives 200 MB of storage, the C2 Platform may determine the system which provisions the e-mail service, so that C2 Platform may communicate with the system to provision the updated service in step 1112.

After the services and systems to provision are determined, the C2 Platform may communicate with a determined system to provision the services (1112). For example, in the case of adding an employee discussed above, the C2 Platform may communicate with a system for provisioning email to implement the email service. After a service is provisioned to a system, the C2 Platform may determine whether or not there are services remaining which need to be provisioned (1114). In the same example, IM and telephone services would remain. If services are remaining, the process repeats from step 1108. In the same example, the steps are repeated until the IM and telephone services are implemented. If all services determined in step 1108 have been provisioned, then the operation logic ends.

In an embodiment, after determining which services to provision in step 1108, the operation logic may perform the remaining steps 1110-1114 by calling a service widget 508.

Figure 12:
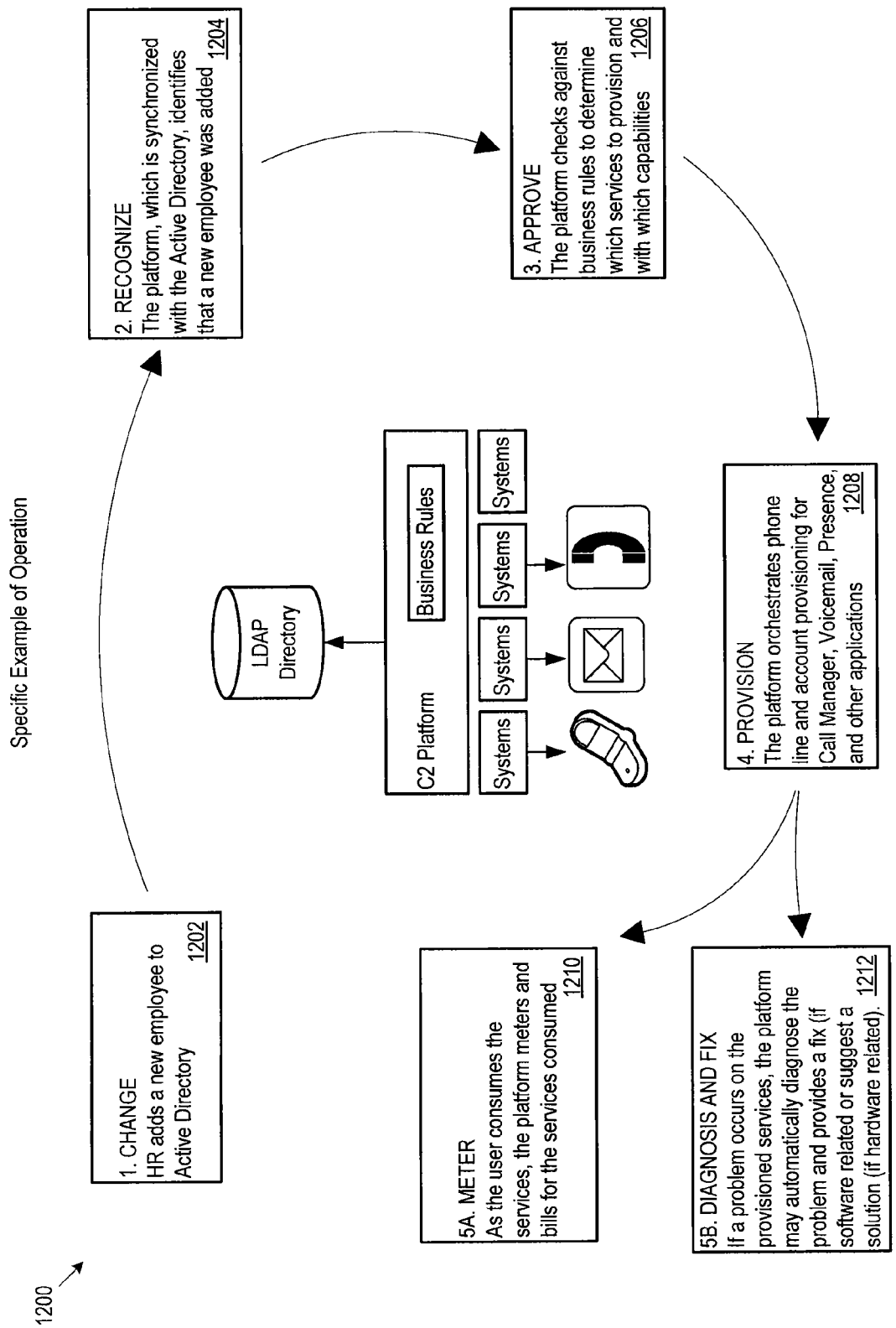
FIG. 12 shows a flow diagram of an example of a common operation performed using the C2 Platform.

FIG. 12 shows a flow diagram 1200 of an exemplary operation activity performed by the C2 Platform, where a new employee is added to the Active Directory.

If human resources adds a new employee to an LDAP directory such as AD (1202), the C2 Platform, which may be synchronized with the AD, may identify that a new employee was added (1204). Next, the C2 Platform may identify and check against the business rules 340 to determine which services to provision and with which capabilities (1206). According to the determination made during step 1206, the C2 Platform may orchestrate the phone line and implement the provisioning as determined by the business rules (1208). Call Manager, voicemail, Presence, and other $3^{rd}$ party applications may be setup according to the business rules. Such provisioning may be performed by calling a service widget 508 which may be configured to represent a telephony setup service. Once everything has been provisioned, the C2 Platform may meter and bill for the services consumed as users consume the services provided through the C2 Platform (1210). The C2 Platform may also detect that a problem has occurred on the provisioned services. The C2 Platform may automatically diagnose the problem and provide a fix or suggest a solution (1212). If the problem is software related, the C2 Platform may provide a direct fix; if the problem is hardware related, the C2 Platform may suggest a solution to resolve the hardware issue.

As discussed above with reference to FIG. 3, the C2 Platform may provide self-service capabilities. Such self-service capabilities may be implemented using the end user self-service functionality 336 implemented in the capabilities layer 304. For example, the C2 Platform may provide an end user with a portal such as the administrative portal 430 that allows the user to self-administer their phone. For instance, the end user can change the button template on his or her phone. The user can either choose from a pre-selected template, or manually configure the buttons themselves. Once the selection is made, the phone buttons are immediately updated. This is one of the many examples of self-service which may be available through the C2 Platform.

The services provided on the C2 Platform may go beyond telephony. Any services in a service catalog can easily provide users with tools to manage their services through a portal, or even automate processes behind the scenes. For example, the C2 Platform could allow a service that automatically provisions a new phone line for new employees whenever they are added to active directory and certain rules are met. The C2 Platform may provide a service catalog for businesses to pick and choose services to subscribe to, such as, for example, the ACIS, a crowd sourcing innovation application. When a service is ordered, the C2 Platform may automatically create a secured connection between the client and the service provider and may provide access, metering and billing.

The C2 Platform's ability to create a secure connection with a new location is described below. Through a portal, a client may create a connection between two locations to gain access to a service in the service catalog by clicking and dragging on the screen. For example, the service catalog may provide a listing of a plurality of services that are available. The client may select one or more of the services from the service catalog. With the ability to create this connection on demand, clients can choose services from the service catalog and immediately gain access to them through the C2 Platform. In providing such ability the C2 Platform may utilize the SDLs. SDLs technically service into the C2 Platform, which can then be combined into business services.

For example, the C2 Platform may be integrated with crowd sourcing functionality, such as, for example, ACIS, which uses Web 2.0 technology and rich Internet applications to take an idea from early concept to execution readiness using mass collaboration between a large number of employees, business partners or customers. In the context of ACIS, multiple technical services may be necessary to create a new ACIS site. And, end users only need a few business services such as creating, modifying and deleting an ACIS site.

The C2 Platform allows automatic provisioning of appropriate services by using business rules. For example, through the C2 Platform, necessary services may be provisioned whenever new employees are added into active directory, when employee's title or level changes or decommission services when an employee leaves the company.

An example of a provisioning in practice is described below. End users may enter their portal and choose to create a new ACIS site. Initially, the end user may see that client's ACIS site does not exist. Once the user enters the necessary information in an administrative account, the new ACIS site is dynamically created. If the user reloads the page, the user may now see that the ACIS site has been provisioned and the user may log in with the user's newly created administrative account.

The implementation discussed above is exemplary. Other implementations may vary any of the supported systems of provided services noted above. For example, other implementations may use different types of systems, types of infrastructure hosting the C2, or types of supported widgets or supported tools.

The platform described above may be implemented in any combination of hardware and software. For example, programs provided in software libraries may provide the functionality that forms the business rules, workflows, or other functions. Such software libraries may include dynamic link libraries (DLLs), or other application programming interfaces (APIs). The logic described above may be stored on a computer readable medium, such as a CDROM, hard drive, floppy disk, flash memory, or other computer readable medium. The logic may also be encoded in a signal that bears the logic as the signal propagates from a source to a destination.

In addition, the platform may be implemented as a particular machine. For example, the particular machine may include a central processing unit ("CPU"), graphics processing unit ("GPU"), and software library for carrying out the functionality that forms the business rules workflows, widgets or embedded tools or other functions noted above. Thus, the particular machine may include a CPU, a GPU, and a memory that stores the logic described above.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

We claim:
1. A migration method comprising:
executing with a processor a migration program stored in a memory, the migration program comprising logic that when executed causes the processor to:
receive a migration request to migrate service data from one or more source systems to one or more new systems;

extract the service data from the one or more source systems to obtain extracted service data;

access a master record stored in a database;

compare the extracted service data with the master record to obtain a comparison between the extracted service data and the master record;

determine whether a change is to be made on the extracted service data based on the comparison;

when it is determined that a change is to be made, make the change on the extracted service data;

determine multiple target systems as the one or more new systems, wherein the extracted service data is to be migrated across the multiple target systems;

determine for each target system of the multiple target systems a portion of the extracted service data to be migrated; and migrate the service data to the multiple target systems, wherein the logic to migrate the service data to the multiple target systems comprises repeatedly communicating with the multiple target systems until all of the extracted service data is migrated across the multiple target systems.

2. The method of claim 1, wherein the one or more source systems comprises multiple source systems.

3. The method of claim 1, wherein the one or more source systems comprises multiple source systems.

4. The method of claim 1, wherein the migration program further comprises logic that when executed causes the processor to identify business rules corresponding to the migration request; and wherein the logic to determine whether a change is to be made on the extracted service data based on the comparison comprises:

determining whether a change is to made on the extracted service data based on the business rules and the comparison, and determining the multiple target systems based on the business rules.

5. The method of claim 1, wherein the migration program further comprises logic that when executed causes the processor to identify business rules corresponding to the migration request; and wherein the logic to extract the service data from the one or more source systems to obtain an extracted service data comprises:

determining a first adaptor for extracting the service data from the one or more source systems based on the business rules, and extracting the service data from the one or more source systems based on the determined first adaptor.

6. The method of claim 5, wherein the logic to migrate the service data to the multiple target systems comprises:

determining a second adaptor for migrating converted service data to the multiple target systems; and migrating the converted service data to the multiple target systems based on the second adaptor.

7. The method of claim 1, wherein the migration program further comprises logic when executed causes the processor to:

after making changes on the extracted service data, receiving approval of the service data from a user.

8. The method of claim 1, wherein the migration program further comprises logic when executed causes the processor to:

receive an additional change instruction to make an additional change on the extracted service data; and make the additional change on the extracted service data based on the additional change instruction.

9. The method of claim 1, wherein the multiple target systems comprise one or more of cloud-based systems.

10. The method of claim 9, wherein the one or more source systems comprises one or more of the cloud-based systems.

11. The method of claim 1, wherein the migration program further comprises logic when executed causes the processor to:

perform a predetermined test based on business rules to ensure that the extracted service data is migrated to the one or more target systems successfully.

12. A migration system comprising:

a processor; and stored on a computer readable memory coupled to the processor:

a migration program comprising logic that when executed causes the processor to:

receive a migration request to migrate service data from one or more source systems to one or more new systems;

extract the service data from the one or more source systems to obtain extracted service data;

access a master record stored in a database;

compare the extracted service data with the master record to obtain a comparison between the extracted service data and the master record;

determine whether a change is to be made on the extracted service data based on the comparison;

when it is determined that a change is to be made, make the change on the extracted service data;

determine multiple target systems as the one or more new systems, wherein the extracted service data is to be migrated across the multiple target systems;

determine for each target system of the multiple target systems a portion of the extracted service data to be migrated; and migrate the service data to the multiple target systems, wherein the logic to migrate the service data to the multiple target systems comprises repeatedly communicating with the multiple target systems until all of the extracted service data is migrated across the multiple target systems.

13. The system of claim 12, wherein the one or more source systems comprises multiple source systems.

14. The system of claim 12, wherein the migration program further comprises logic that when executed causes the processor to identify business rules corresponding to the migration request; and wherein the logic to determine whether a change is to be made on the extracted service data based on the comparison comprises:

determining whether a change is to made on the extracted service data based on the business rules and the comparison, and determining the multiple target systems based on the business rules.

15. The system of claim 12, wherein the migration program further comprises logic that when executed causes the processor to identify business rules corresponding to the migration request; and wherein the logic to extract the service data from the one or more source systems to obtain an extracted service data comprises:

determining a first adaptor for extracting the service data from the one or more source systems based on the business rules, and extracting the service data from the one or more source systems based on the determined first adaptor.

16. The system of claim 15, wherein the logic to migrate the service data to the multiple target systems comprises:
  determining a second adaptor for migrating converted service data to the one or more target systems; and
  migrating the converted service data to the multiple target systems based on the second adaptor.

17. The system of claim 12, wherein the migration program further comprises logic when executed causes the processor to:
  receive an additional change instruction to make an additional change on the extracted service data; and
  make the additional change on the extracted service data based on the additional change instruction.

18. The system of claim 12, wherein the migration program further comprises logic when executed causes the processor to:
  perform a predetermined test based on business rules to ensure that the extracted service data is migrated to the one or more target systems successfully.

\* \* \* \* \*